(12) United States Patent
Defilippi

(10) Patent No.: US 7,997,254 B2
(45) Date of Patent: Aug. 16, 2011

(54) SYSTEM FOR CONTROLLING THE EMISSIONS OF FUEL VAPOURS FROM A VEHICLE

(75) Inventor: Roberto Defilippi, Turin (IT)

(73) Assignee: Dayco Fluid Technologies, S.p.A., Turin (IT)

( * ) Notice: Subject to any disclaimer, the term of this patent is extended or adjusted under 35 U.S.C. 154(b) by 765 days.

(21) Appl. No.: 11/814,474

(22) PCT Filed: Jan. 21, 2005

(86) PCT No.: PCT/IT2005/000032
§ 371 (c)(1),
(2), (4) Date: Mar. 14, 2008

(87) PCT Pub. No.: WO2006/077607
PCT Pub. Date: Jul. 27, 2006

(65) Prior Publication Data
US 2008/0302340 A1 Dec. 11, 2008

(51) Int. Cl.
*F02M 33/02* (2006.01)
(52) U.S. Cl. .......... 123/518; 123/519
(58) Field of Classification Search .......... 123/516, 123/517, 518–520
See application file for complete search history.

(56) References Cited

U.S. PATENT DOCUMENTS

| | | | | |
|---|---|---|---|---|
| 4,411,948 A * | 10/1983 | Ogino et al. | | 442/58 |
| 5,337,721 A | 8/1994 | Kasuya et al. | | |
| 5,453,118 A * | 9/1995 | Heiligman | | 96/147 |
| 5,895,520 A * | 4/1999 | Rolke et al. | | 95/132 |
| 6,540,815 B1 | 4/2003 | Hiltzik et al. | | |
| 6,773,491 B1 * | 8/2004 | Bohl | | 96/130 |
| 7,008,470 B2 | 3/2006 | Makino et al. | | |
| 7,047,952 B1 * | 5/2006 | Yamauchi et al. | | 123/519 |
| 7,305,974 B2 * | 12/2007 | Nakano | | 123/519 |
| 7,507,278 B2 * | 3/2009 | Makino et al. | | 96/132 |
| 2006/0205830 A1 * | 9/2006 | Lebowitz et al. | | 521/125 |
| 2008/0308074 A1 * | 12/2008 | Allen et al. | | 123/519 |
| 2009/0178566 A1 * | 7/2009 | Tschantz et al. | | 96/144 |

FOREIGN PATENT DOCUMENTS

| | | |
|---|---|---|
| EP | 1491755 | 12/2004 |
| JP | 2000303917 | 10/2000 |
| JP | 2001-240407 | 9/2001 |
| JP | 2003-003914 | 1/2003 |
| JP | 2004225550 | 8/2004 |
| WO | WO 03/106833 | 12/2003 |

OTHER PUBLICATIONS

International Search Report for International (PCT) Patent Application No. PCT/IT2005/000032, mailed Sep. 29, 2005, p. 1-4.
Written Opinion for International (PCT) Patent Application No. PCT/IT2005/000032, mailed Sep. 29, 2005, p. 1-4.
Examiner's Report (including English translation) for Japanese Patent Application No. 2007-551816, mailed Jun. 29, 2010.

* cited by examiner

*Primary Examiner* — Thomas N Moulis
(74) *Attorney, Agent, or Firm* — Sheridan Ross, P.C.

(57) ABSTRACT

Described herein is a control system for controlling the emissions of fuel vapors from a vehicle comprising a first adsorption system and a second adsorption system. The first adsorption system is formed by a canister preferably filled with activated carbons having a grain size greater than 4 mm. The second adsorption system is made up of a tubular housing, which has a ratio between the equivalent diameter D and the axial height H of between 1:2.5 and 1:4.5 and is filled with activated carbons having a grain size greater than 4 mm.

8 Claims, 1 Drawing Sheet

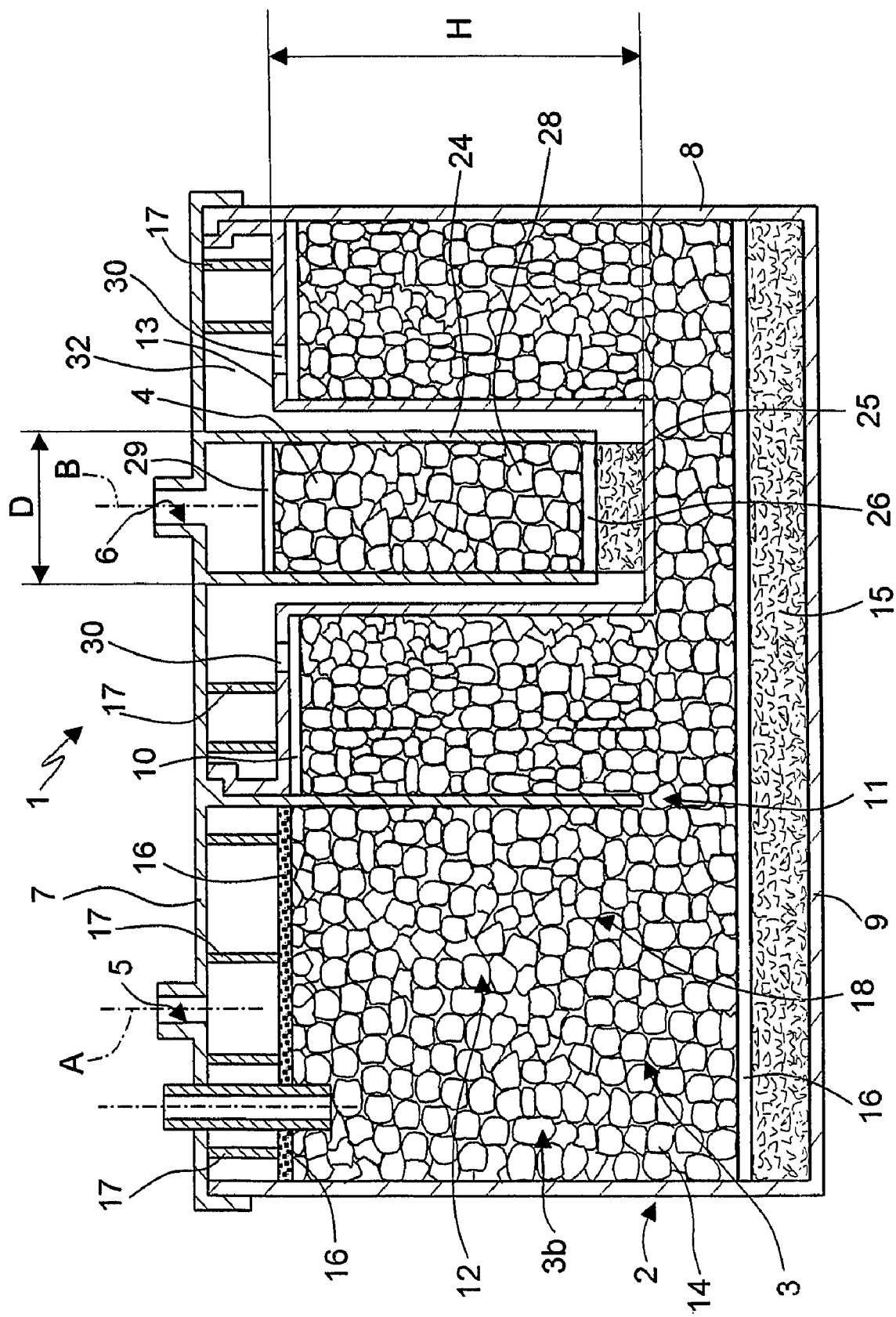

SYSTEM FOR CONTROLLING THE EMISSIONS OF FUEL VAPOURS FROM A VEHICLE

CROSS REFERENCE TO RELATED APPLICATION

This application is a national stage application under 35 U.S.C. 371 of PCT Application No. PCT/IT2005/000032 having an international filing date of Jan. 21, 2005, which designated the United States, the entire disclosure of which is hereby incorporated herein by reference.

TECHNICAL FIELD

The present invention relates to a system for controlling the emissions of fuel vapours from a vehicle, in particular to a control system comprising a system for adsorption of the vapours which uses activated carbons.

BACKGROUND ART

Tanks for motor vehicles are generally provided with a system for controlling the emissions comprising an adsorption system made up of a "canister" or temporary accumulator for preventing fuel vapours from being dispersed into the atmosphere as they come out of the tank.

The canister generally comprises a housing connected to the tank and to the outside environment, and a main filter housed within the housing and traversed by the flow of fuel vapours emitted towards the outside environment.

The main filter is generally filled with granules of activated carbons which are capable of adsorbing hydrocarbons, which are the major constituents of fuel vapours at output from the tank.

Recently research has been directed towards systems for controlling evaporation that will enable better results to be obtained in terms of vapour adsorption and that will reduce further the diffusion of fuel vapours in the environment external to the vehicle.

Generally, within the canister vapour adsorption occurs on granules of activated carbons having a mean size of approximately 2 mm, which enable a high capacity for adsorption and at the same time ensure a low pressure drop, which is a measurement of the resistance that a material opposes to a given flow that traverses it. Basically, the pressure drop of activated carbons must be such that, during the phase of refuelling with the fuel gun inserted in the tank, the system of pressures will enable the fuel vapours to be drawn in instead of being emitted into the atmosphere, thanks to the system referred to as "on-board refuelling vapour recovery" (ORVR), and that consequently all the vapours generated by the handling of the petrol will have to pass within the evaporation-control system and hence through the activated carbons of the canister.

If the pressure drop is too high, the pressure of the system increases in a reverse direction, creating a resistance to further filling of the tank and hence generating frequent jerks or kick-back of the gun during supply with consequent pollution due to the emissions of fuel vapours.

The adsorption system must hence present a high capacity for adsorption and ensure a low pressure drop, but at the same time ensure also a high washing efficiency.

Recently, laws have been promulgated, which require that the admissable levels of emissions of unburnt hydrocarbons towards the outside environment will be reduced to values so low that it is necessary to act no longer only on the vapours coming from the tank that have not been adsorbed by the activated carbons of the canister, but also on the vapours of hydrocarbons released by the activated carbons as residue after the step of regeneration when the vehicle remains parked for a number of days. Said emissions are generally referred to also as "bleed emissions".

Bleed emissions prevalently consist of short-chain hydrocarbon molecules, such as butane, which are entrapped within the granules of carbon of the adsorption system by weak Van der Waals forces, said molecules migrating slowly towards the area of the canister that is in contact with the air and then being dispersed into the surrounding environment.

The diffusion of said molecules depends upon Fick's law, and is a function of the diffusivity, of the type of molecule, of the area of diffusion, i.e., of the geometry of the canister, and upon the concentration of the molecules.

Carbons currently used in canisters are excellent in terms of adsorption capacity and enable good results in terms of pressure drop to be achieved but often do not enable low values of bleed emissions and at the same time a high washing efficiency.

In order to solve said problem, it has for example been proposed to fill the main filter with a first layer formed by first activated carbons with high adsorption power and a second layer of activated carbons with low adsorption power.

Alternatively, it has also been proposed to replace the second layer of activated carbons with an adsorption system made up of a supplementary filter that can be used in series with respect to the main one for abating further the content of harmful agents and in particular for reducing bleed emissions.

Said systems have not always proved very efficient and economically advantageous, and consequently there has been a continuous research directed towards better systems for controlling evaporation.

DISCLOSURE OF INVENTION

A first purpose of the present invention is consequently to provide a system for controlling evaporation that will enable a good compromise to be achieved between the adsorption of fuel vapours and desorption, and at the same time will enable a reduction in bleed emissions, i.e., will make it possible to prevent leakage of hydrocarbons when the vehicle remains standing still, said leakage being due to desorption of the vapours by the adsorption system.

A second purpose of the present invention is to provide a system for controlling evaporation of fuel vapours that will comprise an adsorption system which will enable an adequate capacity for adsorption, but which at the same time will not present any pressure drop and will enable a high washing efficiency.

A third purpose of the present invention is to provide a temporary accumulator of vapours that is of convenient and economically advantageous construction.

The above purposes are achieved by means of a system for controlling evaporation of vapours according to Claim 1.

BRIEF DESCRIPTION OF THE DRAWING

For a better understanding of the present invention, there is now described a preferred embodiment, purely by way of non-limiting example and with reference to the attached plate of drawings, which consists of a single FIGURE illustrating a control system 1 for controlling evaporation in a cross-sectional view and made according to the present invention, said system comprising a box-like housing 2, which encloses a first adsorption system 3 formed by a canister 3b, which in turn encloses a second adsorption system 4.

BEST MODE FOR CARRYING OUT THE INVENTION

The box-like housing 2 comprises: a substantially square and horizontal top wall 7, which forms the cover or lid 7b and has the opening 5 and the bleeder 6; vertical side walls 8, only two of which are shown in the figure; and a bottom wall 9 parallel to the top wall 7.

The box-like housing 2 has an opening 5 with vertical axis A, through which the first adsorption system 3 communicates with the tank not illustrated, and a bleeder 6 with vertical axis B, through which the second adsorption system 4 communicates with the outside environment.

The canister 3b is filled with granules 14 of activated carbons having preferably a grain size greater than 4 mm, still more preferably of between 4 mm and 6 mm. The activated carbons are supported by supporting means 15 arranged on the bottom wall 9 and are contained at the top and at the bottom in one or more horizontal layers 16 made of porous and flexible material, for example felt.

On its inside, the box-like housing 2 is divided by a plane vertical partition wall 10, which comes out of the top wall 7, perpendicular to the straight line joining the two axes A and B and arranged in a direction parallel to a pair of side walls 8. The partition wall 10 extends in a transverse direction as far as the side walls 8 and in a longitudinal direction by an amount such as to define a substantially rectangular section of passage 11 for the fuel vapours. Furthermore, the partition wall 10 and the box-like housing 2 delimit two chambers 12, 13, the first one of which is connected to the opening 5 and the second houses a second adsorption system 4.

In the chamber 12, top layers 16 bear upon a multiplicity of projections 17 facing the bottom wall 9 and integral with the top wall 7 so as to delimit, together with the side walls 8, an inlet space 18 which has the purpose of distributing fuel vapours uniformly along the cross section of the main filter 3.

Housed in the chamber 13 is the second adsorption system 4 formed by a cylindrical housing 24 coming out from the wall 7, made of a single piece therewith and elongated so that it is coaxial with the bleeder 6 of the second adsorption system 4. The housing 24 is filled with granules of activated carbons 28 supported by supporting means 25 and contained at the top and at the bottom in one or more horizontal layers 26 made of porous and flexible material, for example felt.

The second adsorption system 4 defines an equivalent diameter D and an axial height H constituted by the sum of the thickness of the housing portion 24 which comprises the activated carbons and the thickness of the supporting means 25 and of the layers 26.

The housing 24 is partially filled with granules of activated carbons 28 having a grain size, i.e., a mean size of the granules, greater than 4 mm, preferably between 4 mm and 6 mm.

Preferably, the second adsorption system is made so as to present an axial height H greater than the equivalent diameter D, and the diameter is between 20 mm and 50 mm.

Still more preferably, the tubular housing 24 has a ratio between the equivalent diameter D and the axial height H of between 1:2.5 and 1:4.5.

It has been found that, for values of the ratio between the equivalent diameter and the axial height greater than 1:4.5, it is not possible to obtain acceptable values of pressure drop, whereas, for values lower than 1:2.5, an adequate washing efficiency is not achieved.

Even more preferably, the ratio between the equivalent diameter D and the axial height H is equal to 1:3, and in absolute terms, for example, the diameter is 30 mm and the axial height is 90 mm.

It has been surprisingly found that, unlike what is commonly believed, the adoption of activated carbons having a large grain size combined with an appropriate selection of the geometries of the second adsorption system enables the problems of known vapour-control systems to be solved.

During operation, the vapours generated within the tank, for example by evaporation on a sunny day, tend to escape towards the outside environment traversing the system for controlling evaporation 1.

Once the vapours have passed through the opening 5, they accumulate within the inlet space 18 and descend distributed in a substantially uniform way through the adsorbant granules 14 contained in the chamber 12.

Once the vapours have reached the section of passage 11, they enter the chamber 13, where they reverse their direction of motion, reaching the passages 30 that are in the proximity of the top wall 7 of the box-like housing 2.

At this point, they reverse their direction again and descend along the pipe 32 until they traverse the bottom support 26 and then the activated carbons 28 and the top porous support 35, and finally enter the bleeder 6.

Table 1 provides examples of types of activated carbons having a grain size greater than 4 mm which can be used both in the first adsorption system 3 and in the second adsorption system 4.

TABLE 1

| TEST | Unit | GPA 55/4 | Testing method |
|---|---|---|---|
| Grain size | mm | 4.5 ± 0.5 | |
| Weight per liter | g/lt | 350 | ASTM D 2854-89 |
| Permanent deviation per specimen | g/lt | ±20 | |
| Water content | wt % | 2 max | ASTM D 2867-88 |
| Ash content | wt % | 12 max | ASTM D 2866-88 |
| Content of chloride ions | mg/100 gr | 15 max | VW PV 3701 |
| Abrasion hardness | % | 95 min | ASTM D 4058-87 |
| Capacity for working with butane | gr/lt | 74.8 115 | VW PV 3701 ASTM D 5228-92 |
| pH value | PH | 9 | ASTM D 3838-86 |

A comparison test was carried out between a first system for controlling evaporation according to the invention and one according to the known art.

The comparison evaporation system made according to the known art was made up of a 2.7-liter canister filled with Norit CNR 115 activated carbons with a grain size of 2 mm. The evaporation system according to the invention comprised a first adsorption system made up of a 2.7-liter canister filled with GPA 55 activated carbons with a grain size of 5 mm and a second adsorption system made up of a cylindrical tubular housing having a diameter of 30 mm and a height of 90 mm and including 50 cubic centimetres of GPA 55 activated carbons with a grain size of 5 mm.

The pressure drop was measured at 60 Sl/min and the value obtained with the comparison system was 14 mbar, whereas with the system according to the invention was 15 mbar.

A test on bleed emissions was also carried out according to the standard USA CARB for three days with an extremely low washing level (390 lt).

With the known system for controlling evaporation on the third day an emission of 120 mg/24 h was obtained, whereas with the system for controlling evaporation according to the present invention an emission of 10 mg/24 h was obtained and hence much lower than the previous one.

From an examination of the characteristics of the evaporation system 1 made according to the present invention the advantages that it enables are evident.

In particular, a system for controlling evaporation made according to the present invention enables an excellent adsorption of fuel vapours at output from the tank at the same time without any loss of pressure or leakage of fuel vapours during stoppage of the vehicle, and a high washing efficiency to be obtained.

Furthermore, a system for controlling evaporation made according to the present invention has a much lower cost than does an equivalent vapours-control system obtained by means of the adoption of a monolith as second adsorption system.

What is claimed is:

1. A control system for controlling the emissions of fuel vapours from a vehicle, said system comprising a first adsorption system, which comprises a canister, and a second adsorption system, which comprises a tubular housing extending along a first axis, said system being characterized in that said tubular housing is filled with activated carbons having a grain size greater than 4 mm and less than or equal to 6 mm, and wherein the second absorption system has an axial height H greater than the equivalent diameter D.

2. The control system according to claim 1, characterized in that said second adsorption system has a ratio between the equivalent diameter D and the axial height H of between 1:2.5 and 1:4.5.

3. The control system according to claim 1, characterized in that said second adsorption system has a ratio between the equivalent diameter D and the axial height H equal to 1:3.

4. The control system according to claim 1, characterized in that said tubular housing is obtained from a top wall of said canister.

5. The control system according to claim 1, characterized in that said first adsorption system and said second adsorption system act consecutively for the abatement of fuel vapours.

6. The control system according to claim 1, characterized in that said first adsorption system and said second adsorption system are separated and connected together so as to enable a sequential contact with the fuel vapours.

7. The control system according to claim 1, characterized in that said first adsorption system and said second adsorption system are housed within one and the same box-like housing.

8. A method for controlling emissions of fuel vapours from a vehicle, said method comprising:
   providing a control system including a first absorption system including a canister, a second absorption system including a tubular housing extending along a first axis, said tubular housing being filled with activated carbons having a grain size greater than 4 mm, and said first and second absorption systems being housed within a single housing;
   providing an opening in the first absorption system for receiving the fuel vapours;
   accumulating the fuel vapours within an inlet space within the first absorption system;
   causing the fuel vapours to descend and distribute through absorbent granular material contained in the first absorption system;
   passing the fuel vapours through a passage into a chamber of the first absorption system wherein the fuel vapours rise, and reach a plurality of passages located along a top wall of the housing;
   passing the fuel vapours in a reverse manner so that fuel vapours descend along the tubular housing of the second absorption system;
   passing the fuel vapours to traverse a bottom support of the second absorption system, wherein the fuel vapours reverse direction and rise within the tubular housing contacting the activated carbons within the tubular housing; and
   passing the fuel vapours into a bleeder connected to the control system.

* * * * *